US008325750B2

(12) United States Patent
Eugene et al.

(10) Patent No.: US 8,325,750 B2
(45) Date of Patent: Dec. 4, 2012

(54) ACCELERATED SYSTEM AND METHODS FOR SYNCHRONIZING, MANAGING, AND PUBLISHING BUSINESS INFORMATION

(75) Inventors: Cherny Eugene, Los Angeles, CA (US); Fisch Gilat, Moshav Saad (IL); Cohen Ronen, Nahariya (IL); Levin Stanley, Kfar Vradim (IL)

(73) Assignee: SAP AG, Walldorf (DE)

( * ) Notice: Subject to any disclaimer, the term of this patent is extended or adjusted under 35 U.S.C. 154(b) by 292 days.

(21) Appl. No.: 12/787,316

(22) Filed: May 25, 2010

(65) Prior Publication Data

US 2010/0229111 A1 Sep. 9, 2010

Related U.S. Application Data

(63) Continuation of application No. 10/990,293, filed on Nov. 15, 2004, now Pat. No. 7,751,417.

(51) Int. Cl.
*H04L 12/28* (2006.01)
*G06F 7/00* (2006.01)

(52) U.S. Cl. ........ 370/412; 370/254; 370/260; 707/802; 709/220

(58) Field of Classification Search .......... 370/254–360, 370/386–415; 709/220–229; 707/102–109; 715/503–509, 700–760
See application file for complete search history.

(56) References Cited

U.S. PATENT DOCUMENTS

| | | | |
|---|---|---|---|
| 6,185,613 B1 | 2/2001 | Lawson et al. | |
| 6,308,201 B1 | 10/2001 | Pivowar et al. | |
| 6,341,316 B1 | 1/2002 | Kloba et al. | |
| 6,466,947 B2 | 10/2002 | Arnold et al. | |
| 6,757,723 B1 | 6/2004 | O'Toole et al. | |
| 6,879,976 B1 * | 4/2005 | Brookler et al. | 1/1 |
| 6,883,136 B1 * | 4/2005 | Weinberg et al. | 715/205 |
| 6,910,044 B2 * | 6/2005 | Weinberg et al. | 707/792 |
| 6,938,038 B2 * | 8/2005 | Weinberg et al. | 1/1 |
| 6,981,034 B2 | 12/2005 | Ding et al. | |
| 7,089,259 B1 | 8/2006 | Kouznetsov et al. | |
| 7,089,583 B2 | 8/2006 | Mehra et al. | |
| 7,139,817 B1 | 11/2006 | English et al. | |
| 7,143,076 B2 * | 11/2006 | Weinberg et al. | 1/1 |

(Continued)

OTHER PUBLICATIONS

Wang, Shaojie, et al., "Modeling and Integration of Peripheral Devices in Embedded Systems", DATE '03: Proceeding of the Conference on Design, Automation and Test in Europe—vol. 1, Mar. 2003, pp. 1-6.

*Primary Examiner* — Man Phan
(74) *Attorney, Agent, or Firm* — Buckley, Maschoff & Talwalkar LLC

(57) ABSTRACT

Embodiments of the invention provide an accelerated system and methods for gathering business information, augmenting that information to conform to requirements for sharing the information and for synchronizing, managing and publishing the information across the supply chain. A control module business gathers information from a variety of enterprise wide systems and stored via an acceleration engine. The information is published to a data pool and registered by the data pool with a registry. One or more embodiments of the user interface component comprise declaratively defined interfaces that are not hardcoded in a source code program. The server interface is capable of utilizing declaratively defined interface definitions for data pool specific messages and data attributes that are not hardcoded in a source code program. Declaratively defined user and server interfaces allow for modification of the interface without altering the source code.

15 Claims, 7 Drawing Sheets

U.S. PATENT DOCUMENTS

| | | |
|---|---|---|
| 7,143,339 B2 * | 11/2006 | Weinberg et al. ............. 715/212 |
| 7,181,686 B1 | 2/2007 | Bahrs |
| 7,240,106 B2 | 7/2007 | Cochran et al. |
| 7,275,243 B2 | 9/2007 | Gibbons et al. |
| 7,350,226 B2 | 3/2008 | Moriconi et al. |
| 7,487,342 B2 | 2/2009 | Cronk et al. |
| 7,519,908 B2 | 4/2009 | Quang et al. |
| 8,140,410 B2 * | 3/2012 | Sugumaran .................. 705/27.1 |
| 2004/0210584 A1 | 10/2004 | Nir et al. |
| 2005/0055633 A1 | 3/2005 | Ali et al. |
| 2005/0125621 A1 | 6/2005 | Shah |
| 2005/0256798 A1 | 11/2005 | Herter et al. |
| 2005/0267791 A1 * | 12/2005 | LaVoie et al. .................... 705/7 |
| 2005/0273521 A1 | 12/2005 | Patrick et al. |
| 2006/0074841 A1 | 4/2006 | Sugumaran |
| 2006/0106859 A1 | 5/2006 | Cherny et al. |
| 2006/0106881 A1 * | 5/2006 | Leung et al. .................. 707/200 |
| 2006/0106897 A1 * | 5/2006 | Sapozhnikov et al. ....... 707/204 |
| 2007/0061427 A1 * | 3/2007 | Vishnia-Shabtai et al. ... 709/220 |
| 2007/0106612 A1 | 5/2007 | O'Brien et al. |
| 2007/0226679 A1 | 9/2007 | Jayamohan et al. |
| 2008/0091640 A1 * | 4/2008 | Sugumaran ....................... 707/1 |
| 2008/0091648 A1 * | 4/2008 | Sugumaran ....................... 707/2 |

* cited by examiner

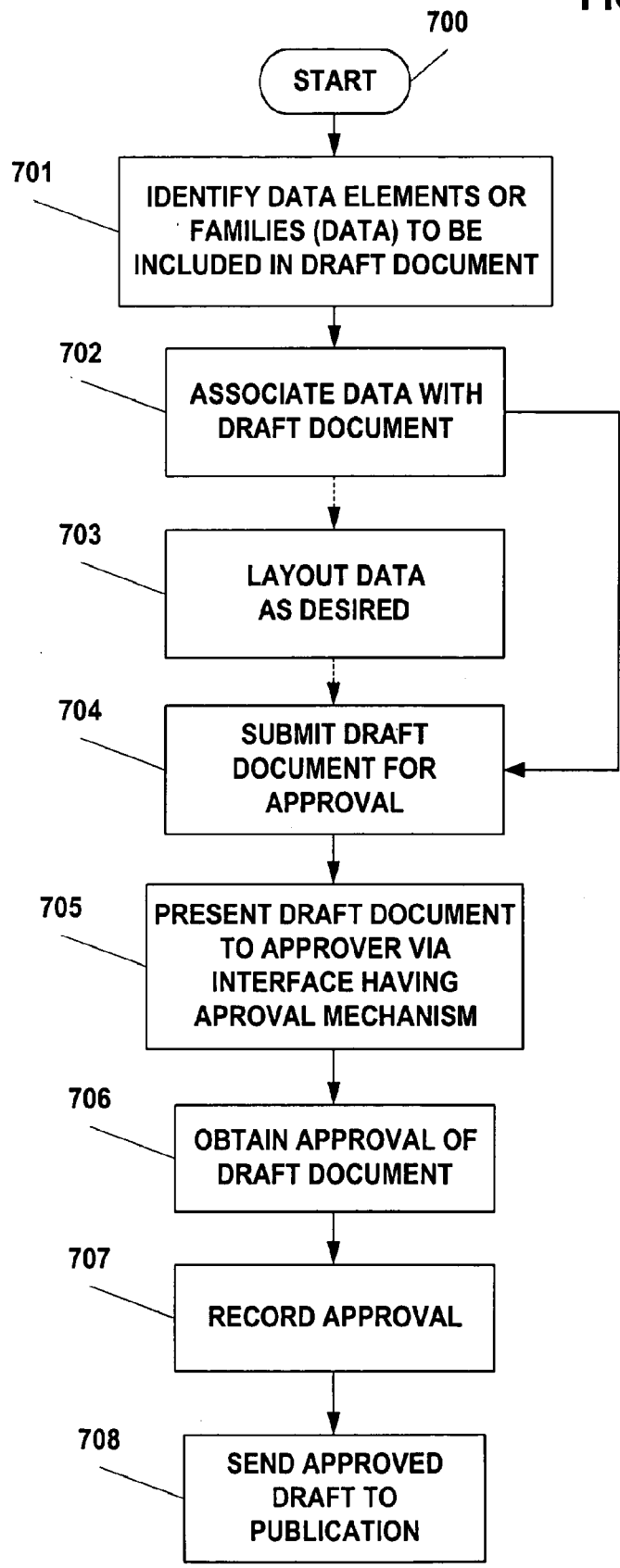

ACCELERATED SYSTEM AND METHODS FOR SYNCHRONIZING, MANAGING, AND PUBLISHING BUSINESS INFORMATION

This application is a continuation of application Ser. No. 10/990,293, filed Nov. 15, 2004 (issued as U.S. Pat. No. 7,751,417). The patent application identified above is hereby incorporated by reference in its entirety to provide continuity of disclosure.

BACKGROUND OF THE INVENTION

1. Field of the Invention

Embodiments of the invention described herein pertain to the field of computerized network systems. More particularly, but not by way of limitation, one or more embodiments of the invention enable businesses to perform accelerated synchronization, management and publication of business information across a supply chain.

2. Description of Related Art

Competitive businesses in the global marketplace rely on the efficient exchange and synchronization of business information to improve the performance of the supply chain. For instance, the synchronization of information that uniquely describes a product or service exchanged between trading partners is fundamental to building collaborative commercial relationships among retailers, manufacturers, and other supply chain participants. Various systems exist for synchronizing such business-to-business information between trading partners. These systems, often referred to as Global Data Synchronization (GDS) systems, are important because effective GDS systems lead to consolidation and management of master product data, which greatly increases internal supply chain efficiency. Many also consider GDS to be a fundamental building block for realizing the full potential of Radio Frequency Identification (RFID) and Electronic Product Code (EPC) tags on various product configurations (e.g., pallets and cases of a particular product), GDS and EPC initiatives are designed to work together to improve business performance amongst a set of interrelated trading partners through the sharing of well-formed data that describes information associated with a set of products or services.

More and more businesses are utilizing entities referred to as data pools that act as an interface point between supply chain entities such as manufacturers and retailers. These data pools provide a message-based framework for synchronizing item, organization and pricing data. For instance, manufactures publish data to the data pool in accordance with a set of specific rules defined by the data pool and other parties such as retailers or other manufactures subscribed to the data pool are kept in sync with information published to the data pool.

Retailers that desire to order and sell a product made by a manufacturer must first find the product so that it may be ordered. In order to find a product of interest, an entity known as the "Global Registry" may be employed in order to lookup the basic parameters of a product. The lookup generally includes the location of the data pool where the full product information can be found. The predominant registry in the industry is known as the "GS1 Global Registry™". The Global Registry stores unique product identifiers (referred to as GTINs and discussed in further detail below) and location information about each of the respective parties in the supply chain (e.g., Global Location Numbers called GLNs and also discussed in more detail below). Put generally a GTIN describes what an item is and a GLN describes who has and where the item is located. The association of data pools and the Global Registry described herein are known as the GlobalData Synchronization Network (GDSN).

For businesses in the manufacturing sector (data pool suppliers) and retailing sector (data pool customers) to utilize the Global Registry and synchronize data with one another each party typically performs the following basic steps. First internal supplier data (e.g., source information) is reviewed and if necessary modified to conform to generally accepted standards (see e.g., FIG. 1A, step 100). For instance, each product or unit of sale is given a GTIN. The GTIN provides a basis for identifying when a unit of sale passes through a retail point of sale, is delivered, ordered, invoiced, or is otherwise involved in a transaction. A GTIN comprises up to 14 digits and can be associated with raw materials or completed end user products and may also include services. The number allocated to a product needs to be communicated from the manufacturer through the supply chain in advance of transaction, so that business transactions can be set up.

In terms of data pool information exchange, the supplier of information may also define information that uniquely identifies itself and other legal entities, trading parties and locations considered part of or needing access to supply chain information. This identifying information, typically referred to as a Global Location Number (GLN), provides a standard means of identification. The GLN is simply a 13-digit number used to uniquely identify any legal, functional or physical entity. Some examples of parties and locations that can be identified with GLNs, include but are not limited to, functional entities such as a purchasing department or customer number within a legal entity, an accounting department, a returns department, a nursing station, or any other group that performs a definable set of functions. GLNs may also act as a mechanism for identifying physical entities such as a particular room or section of a building, a warehouse, or aspects of a physical location such as a loading dock, delivery point, cabinet, or other location specific information. It is also feasible to utilize GLNs to identify buyers, sellers, companies, subsidiaries or divisions such as suppliers, customers, financial services companies, or any other entity or trading partner.

After the supplier's internal data is prepared for a given source data pool, the data is then uploaded to the source data pool that complies with appropriate standards (see e.g., FIG. 1A, step 102). There are various data pools and each data pool has mandatory and optional aspects. For instance, a data pool may collect descriptive data that contains a standardized set of attributes, values, trade item information, trading partner information, product and packaging information (e.g., shipping unit information such as a pallet), consumer unit (e.g., typically a trade item in its retail form). In at least one instance attributes are used as a mechanism to name associated data (e.g., Color) and values identify the data itself associated to the attribute name (e.g., Blue). Both attributes and values can be recursive and thereby identified as a repeatable attribute/value. Any product or service having a need to retrieve predefined information that may be priced, ordered or invoiced at any point in any supply chain is typically referred to as a trade item. In this context, the term consumer unit is intended to indicate to the retailer that a particular item should be considered as a potential unit of sale.

Each data pool autonomously transfers basic information from the uploaded data to the Global Registry that in turn holds the information and stores the location of the supplier's data pool (see e.g., FIG. 1, step 104). Customers may search the Global Registry via their own destination data pool for information about the supplier that the customer may wish to obtain as part of its subscription to the destination data pool (see e.g., FIG. 1, step 106). The Global Registry identifies the source data pool of information that customers may request.

A synchronization engine enables trading partners to perform the publication and subscription process for sending and receiving information and synchronizes information between each of the respective data pools (see e.g., FIG. 1, step 108). The synchronization engine allows each trading partner to maintain a single point of entry to its chosen data pool, Once implemented, GDS allows for the continuous updating of data attributes related to products for example between a plurality of computing systems in order to ensure that the data is kept identical in all locations that access the data. This synchronization process occurs in order to keep businesses up to date with changes and modifications to products and prices for example. The proper update of product data also enables a more efficient supply chain and eliminates transactions with erroneous prices or discontinued products for example.

On the manufacturer or supplier side the process of reviewing and publishing items for registration and publication to retail trading partners is in most cases a laborious process that involves development of customized applications that obtain the relevant information from the manufacture side and provide that information to the data pool in a publishable form. Another issue that arises for suppliers is that existing systems for managing and publishing data to the supplier's data pool of choice cannot efficiently handle voluminous amounts of data and have a tendency to fail once the amount of data reaches a certain threshold (e.g., 10,000 records). Hence there is a need for an accelerated and scalable system that can effectively obtain and manage supplier data to ensure that the supplier data properly conforms to appropriate standards and then publish that data to the supplier's data pool of choice for subsequent synchronization.

SUMMARY OF THE INVENTION

Embodiments of the invention provide an accelerated system and methods for gathering business information, augmenting that information to conform to requirements for sharing the information and for synchronizing, managing and publishing the information across the supply chain. Through use of a control module business information is gathered from a variety of enterprise wide systems and stored via an acceleration engine. After augmenting and/or altering the information to conform to the requirements of a desired repository of information known as a data pool, the information is published to the data pool and registered with a registry to allow other entities to lookup the information. One or more embodiments of the invention allow for the rapid publication and modification of publication related data using advanced querying mechanisms of the acceleration engine. The publication features of the system allow for multi-lingual output and support for multiple output types including print and web based publications using the same inherent product data for example data in a product catalog. In addition, subscribing to product information is performed in the inverse direction with respect to a data pool allowing not only manufacturers, but also retailers to gain the benefits of the accelerated system.

In terms of the user interface of the system, one or more embodiments of the user interface component comprise declaratively defined interfaces that are not hardcoded in a source code program. In terms of the server interface of the system that interfaces to the various data pools, one or more embodiments of the server interface component utilized in communicating with data pool are capable of utilizing declaratively defined interface definitions for data pool specific messages and data attributes that are not hardcoded in a source code program. Declaratively defined 'user and server interfaces allow for modification of the respective interface without altering the source code, without recompiling and without reinstalling program components and this methodology of altering interfaces allows lower skilled level employees to install and maintain the system.

One or more embodiments of the invention provide an interface and methods that enable a user to logon to the system and create users, roles and authorizations for other users; manage trade items according to global trade item number (GTIN); search and display items, edit trade item information, and create new items; view detailed trade item data, including images, attributes, hierarchies and all other data entered for the item; update and augment data for a specific trade item; register trade items and remove items from the source data pool and the Global Registry; establish a list of trade partners by adding and removing the trade partners to/from the system; manage data pool connections, adding, editing and deleting data-pool information; publish single registered GTINs to trade partners; publish a selection of trade items to a single trade partner, and manage the system metadata by editing the data entry screens.

Specifically, GTIN management comprises various actions and functions that enable the user to define and control one or more GTINs. For instance via a GTIN management interface users can view the status and hierarchy of trade items existing in the system, create new trade items, edit and augment data for existing trade items, and delete trade items from the system. Once the trade item information is complete, users can validate and register the trade item, for subsequent publication to trade partners. This insures that only clean and validated data is propagated to the trade partners.

To create a new trade item using the GTIN management functions it is typically necessary to gather a GTIN number and name and also have the name of the source of product information. Users then provides to the system the GTIN, Product Type (industry classification for the item; different industries—such as pharmaceuticals, clothing or meat—may use their own product identity coding scheme), the GTIN name (actual product name), target market (country level or higher geographical definition in which the supplier wants to make the GTIN available to trade partners), and the information provider (the unique identifier of the source data pool that receives the data from the supplier and registers it with the Global Registry). The information provider is the source of data for the trade item for all partners requesting the data. Subsequent to entry the system performs a check to ensure that all information entered is valid. The GTIN management functions also include mechanisms for editing, adding or removing trade items already stored on the system. For instance, users can search for a set of trade items, make changes or appropriate modifications to that item and then save whatever actions are taken into the system.

Once the trade item information is complete, users can submit validate and register the trade item for subsequent publication to trade partners. This insures that only clean and validated data is prorogated to the trade partners. For instance, upon completion of the GTIN users submit the information to the control module which verifies the data conforms to system wide rules, if so the module enables the user to register the GTIN by posting the GTIN and any associated information to the data pools as defined by the user.

In addition to implementing the functionality described above the control module provides mechanisms for presenting interface components that utilize multi-valued attributes stored in the database coupled with the acceleration engine. For instance, a single product can be given multiple values that define different characteristics of the product. A product that is packaged in a cardboard container and wrapped in plastic can be associated with both values rather than with a single value. In addition, this allows for validation of the information at entry time in the user interface by presenting the user with a pull down list for example that only allows for these two values to be specified as opposed to a text field entry that allows for text based input that must be validated later.

One or more embodiments of the invention may interface with data pools such as UUCnet and Transora. The control module may couple to the data pools through a universal adapter framework and message queuing service for example. By declaratively specifying the semantics of a data pool including the message formats and data attributes and formats required, a new data pool or data pool version may be supported without modifying any source code within the system.

The acceleration engine provides mechanisms for improving system performance and is integrated in one embodiment of the invention to a publication engine. The acceleration engine acts as a mechanism for managing the product and trade-items stored in the system and also includes the functionality required for backup and restore, and metadata management of data utilized by control module. The acceleration engine is an integrated system for content management and publishing that uses a SQL Database Management System (DBMS) that in one or more embodiments of the engine bypasses SQL or optimizes the SQL for its searching, sorting, and retrieval operations. Bypassing or implementing an optimized SQL interpreter allows for increase performance since standard SQL does not support the kinds of advanced structures that allow for high performance product content management.

The publication engine also serves as an integrated catalog management tool and administration mechanism that is coupled through to a synchronized set of supply chain data. Unlike the control module which interfaces with various data pools, publication engine provides functions for generating business documents such as catalogs, brochures, web pages, user interfaces and other such documents. The publication engine is coupled through to the DBMS and backend systems through a server component contained within the acceleration engine. Hence the publication engine has access to clean data controlled by the control module since the control module is responsible for the processing of the valid input and output of data. The publication engine also allows users to generate draft documents for approval and record the approval of these documents. This enables the approving party to ensure that publication of a document (either hardcopies of electronically) is only triggered when approval is properly received and that all modifications or changes made to a draft document are propagated through to publication of the document (e.g., product catalog, web page, etc.).

A back-end system is used to retrieve information from enterprise information systems and provides a single point of access for all desired data sources of an enterprise. Information aggregated from the various data sources within an enterprise allows for simplified processing on the Synchronization management interface since the specifics of obtaining data from the various sources is abstracted out by the back-end system.

BRIEF DESCRIPTION OF THE DRAWINGS

FIG. 6 illustrates the process for generating draft documents and submitting those documents for approval and subsequent publication.

DETAILED DESCRIPTION OF THE INVENTION

An accelerated system and methods for synchronizing, managing, and publishing business information is described herein. The following descriptions of the various embodiments of the invention are exemplary, rather than limiting, and many variations and modifications are within the scope and spirit of the invention. Although numerous specific details are set forth in order to provide a thorough understanding of the present invention, it will be apparent to one of ordinary skill in the art, that embodiments of the invention may be practiced without these specific details. In other instances, well-known features have not been described in detail in order to avoid unnecessarily obscuring the present invention, Readers should note that although examples of the invention are set forth herein, the claims, and the full scope of any equivalents, are what define the metes and bounds of the invention.

Figure 1A:
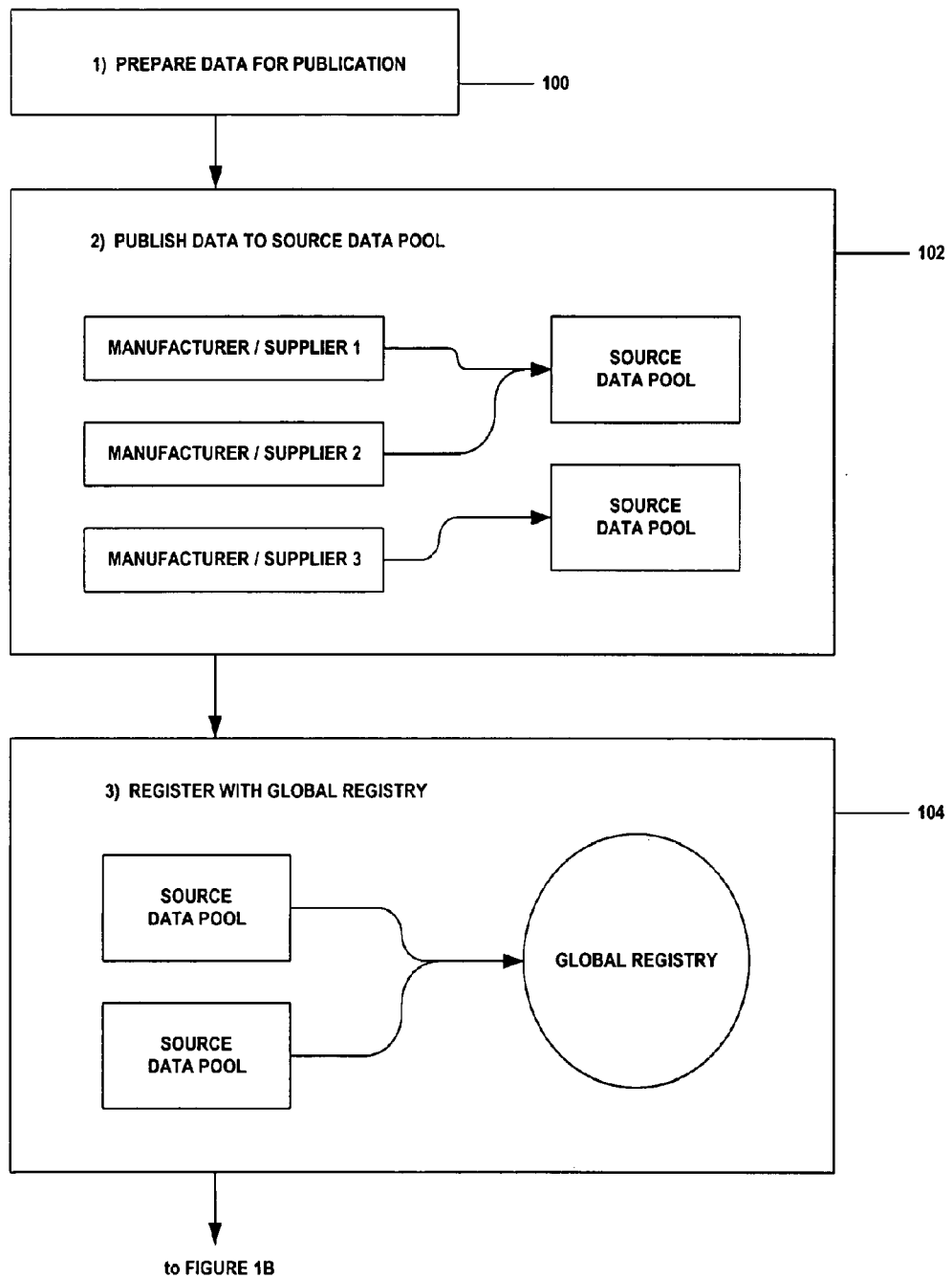
FIGS. 1A and 1B illustrate the process and systems utilized to synchronize business data across a supply chain.
Figure 1B:
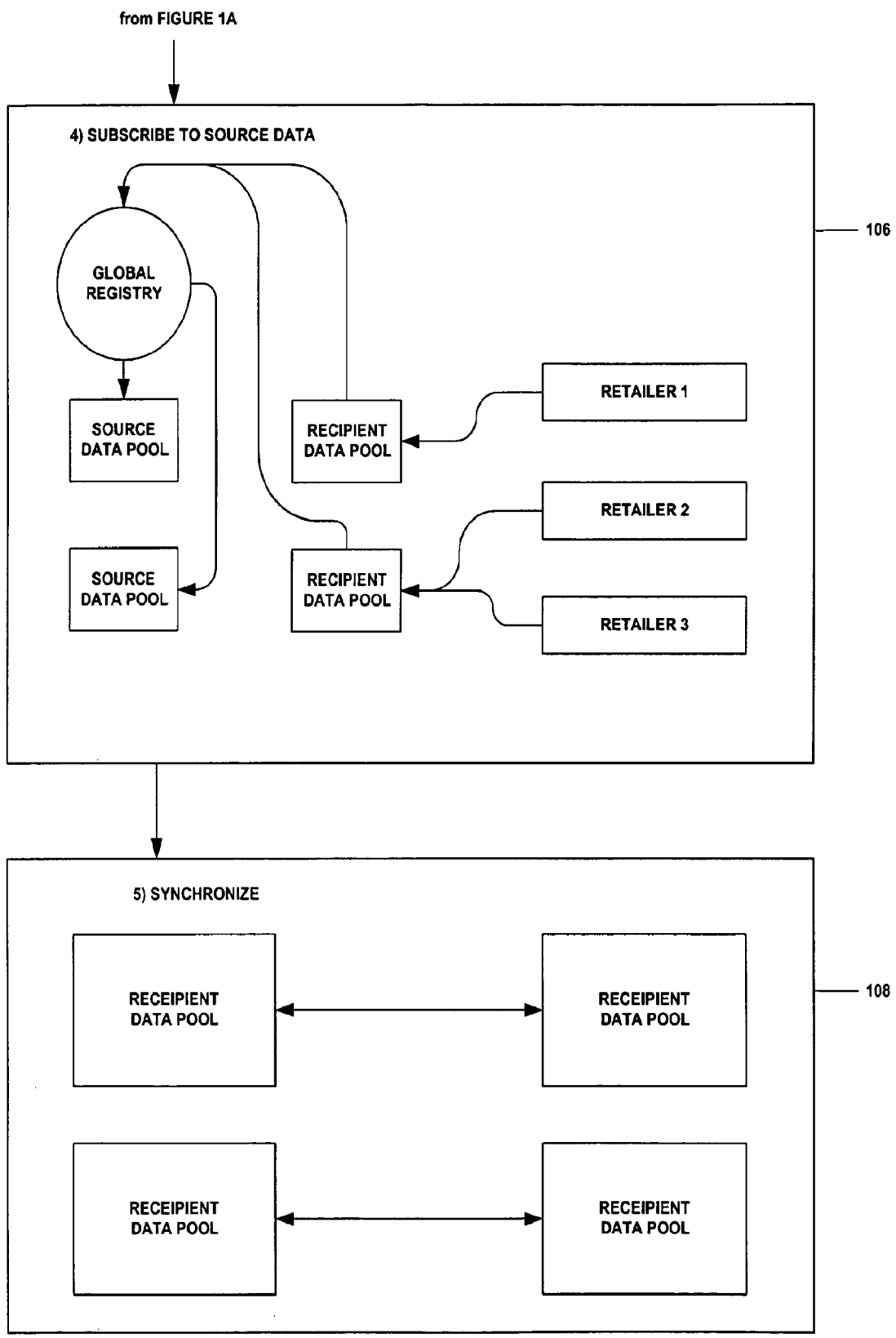
Figure 2:
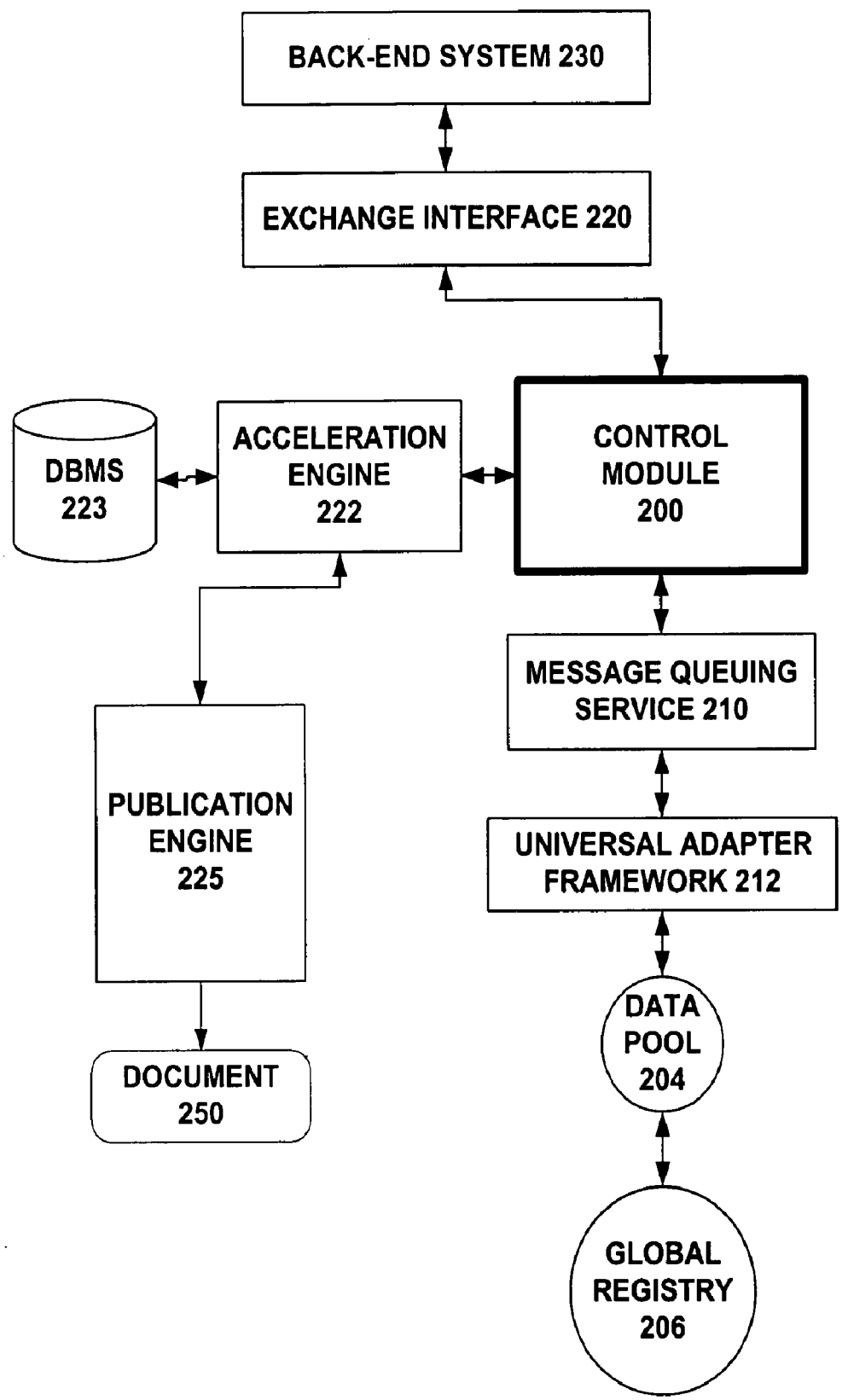
FIG. 2 illustrates an accelerated system for integrating and distributing business information from back-end systems to the supply chain.

FIG. 2 illustrates a topology for managing and accelerating the synchronization of business information across a supply chain. Control module 200 provides various functions for managing the synchronization of business information and can, for instance, prepare data to be synchronized across a supply chain and then publish, manage and maintain that data over time. When used in global supply chain environment, the control module 200 provides for the global synchronization of trade item data between suppliers, data pool 204 and the GS 1 Global Registry 206. Control module 200 can act as a stand alone component utilized to integrate business information into data pool 204 and/or provide functionality that enables the interface to seamlessly couple with back-end systems and publication systems thereby ensuring uniform data throughout key avenues of the business infrastructure. Although an artisan of ordinary skill will recognize it is feasible to implement control module 200 using various computer programming languages, in one embodiment of the invention control module 200 is a Java-based application that is the main interface to the system and may comprise an application server.

Connected to back-end system 230 through exchange interface connector 220, control module 200 imports trade-item data for enhancement and storage, registration with the data pools and Global Registry, and subsequent publication to trade partners. For instance, control module 200 provides functionality for creating and enhancing data-sync specific data and also contains mechanisms for retrieving and storing such data on back-end systems which can be integrated through the exchange interface described in further detail below. In one or more embodiments of the invention control module 200, provides mechanisms for registering and publishing such data-sync specific data to data pool 204 and Global Registry 206. One or more embodiments of the server interface component utilized in communicating with data pool 204 comprise declaratively defined interface definitions for data pool specific messages and data attributes that are not hardcoded in a source program. Declaratively defined server interfaces allow for modification of the server interface without altering the source code, without recompiling and without reinstalling program components and this methodology of altering server interfaces allows lower skilled level employees to install and maintain the system. Control module 200 enables users to ensure that business information to be published into data pool 204 adequately conforms with standards defined by the data pool. Control module 200 also provides users with the ability to enhance data prior to publication to the data pool. Hence users may utilize control module 200 as a generalized tool for managing the publication of trade item data to be shared between the suppliers and the suppliers' trade partners.

At a functional level control module 200 provides an interface and a set of underlying modules that enable the user to perform the following operations: log on to the system, and create users, roles, and authorizations for other users; manage trade items according to global trade item number (GTIN). Users can search and display items, edit trade item information, and create new items; view detailed trade item data, including images, attributes, hierarchies and all other data entered for the item; update and augment data for a specific trade item; register trade items and remove items from the source data pool and the Global Registry; establish a list of trade partners by adding and removing the trade partners to/from the system; manage data pool connections, adding, editing and deleting data-pool information; publish single registered GTINs to trade partners; publish a selection of trade items to a single trade partner, and manage the system metadata by editing the data entry screens in the control module.

Figure 5:
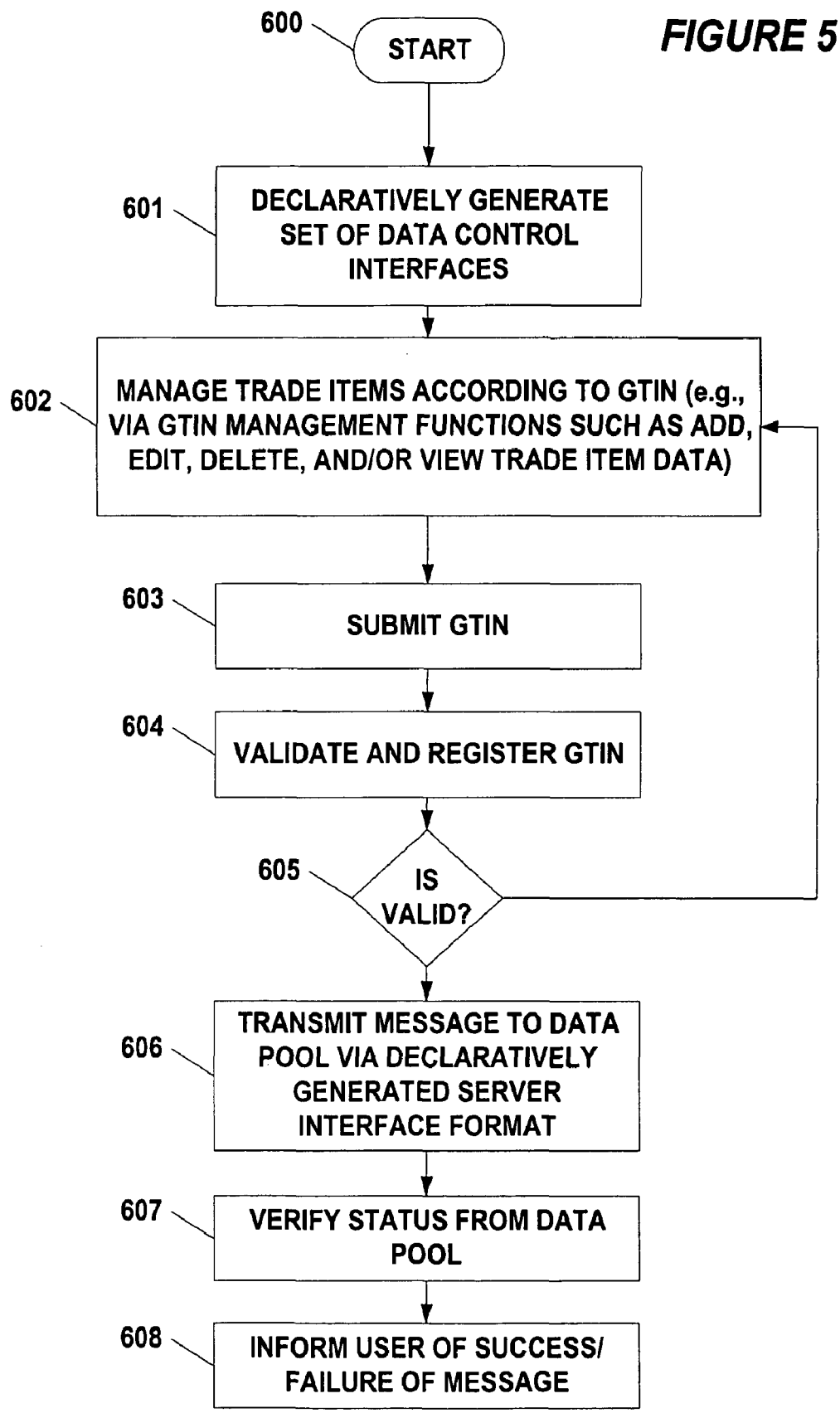
FIG. 5 illustrates workflow involving transfer of information from one or more embodiments of the invention to or from a data pool.

The various functions the control module is configured to execute are typically executed from a user interface comprising components for implementing the following top level functions: GTIN Management, GTIN Registration, Publication By GTIN, Publication By Partner, Trade Partner Management, Data Pool Management, User Administration, and Metadata Management. One or more embodiments of the user interface component comprise declaratively defined interfaces that are not hardcoded in a source code program. Declaratively defined interfaces allow for modification of the interface without altering the source code, 'without recompiling and without reinstalling program components and this methodology of altering user interfaces allows lower skilled level employees to install and maintain the system. FIG. 5 illustrates and describes in more detail below the various functions enabled within each of these top-level choices implemented by control module 200.

Referring now to FIG. 5 for purposes of illustration, users can perform GTIN management using one of the set of data control interfaces declaratively generated at step 601. GTIN management comprises various actions and functions that enable the user to define and control one or more GTINs (see e.g., FIG. 5, step 602). For instance via a GTIN management interface users can view the status and hierarchy of trade items existing in the system, create new trade items, edit and augment data for existing trade items, and delete trade items from the system. Once the trade item information is complete, users can validate and register the trade item for subsequent publication to trade partners thereby ensuring that only clean and validated data is propogated to the trade partners.

To create a new trade item using the GTIN management functions of step 602 it is typically necessary to gather a GTIN number and name and also have the name of the source of product information. Users may then provide the GTIN to the system (see e.g., FIG. 5, step 603) as well as product type (industry classification for the item; different industries—such as pharmaceuticals, clothing or meat—may use their own product identity coding scheme), the GTIN name (actual product name), target market (country level or higher geographical definition in which the supplier wants to make the GTIN available to trade partners), and the information provider (the unique identifier of the source data pool that receives the data from the supplier and registers it with the Global Registry). The information provider is the source of data for the trade item for all partners requesting the data. Subsequent to entry the system performs a check to ensure that all information entered is valid (see e.g., FIG. 5, steps 604 and 605—discussed in more detail below), The GTIN management functions also include mechanisms for editing, adding or removing trade items stored on the system. For instance, users can search for a set of trade items, make changes or appropriate modifications to that item and then save whatever actions are taken into the system.

One embodiment of the invention comprises GTIN maintenance screens which groups the trade item data into tabbed data-entry screens, to facilitate organized maintenance of business information. The fields of the screens are generally grouped according to the categories of attributes of the source data pool. Compulsory fields are flagged as such via a visual reference and the system is configured to only allow users to transfer to another region of the user interface when these fields contain valid values. Users can view the identification data for the selected GTIN. In addition, users can add or edit descriptive information by entering information in the following fields: Short Description, Full Description, Product No. (for internal use; referred to as Product in legacy systems).

Users can obtain further detail about a trade item via the GTIN detail interface which displays an image of the trade item (if any), and relevant attributes, hierarchies and other data entered for the trade item. Users can use the GTIN detail interface to validate the item data to ensure that it is compliant with the GDS minimum requirements. For non-compliant items, users can modify the item as needed (through the GTIN maintenance interface). In one embodiment of the invention the GTIN detail interface comprises status fields as follows:

| Status | Meaning |
| --- | --- |
| In Progress (Pending Complete) | The complete details of the item have not yet been entered, prior to applying for GTIN registration. |
| In Progress (Pending Registration) <date> | The item data has been sent to the trade pool for registration but notification of registration details have not yet been received. |
| Registered | The item has been fully registered by the data pool. |
| In Progress (Pending Change) | The item has been registered and a "Change Item" message has been sent to UCCNet. |
| In Progress (Pending Correct) | The item has been registered and a "Correct Item" message has been sent to UCCNet. |
| In Progress (Pending Unregister) | A message has been sent to the source data pool to remove the item from the registry. |
| Modified | The item has been registered and its information has been modified in GDS, but no update has yet been sent to the data pool. |
| Unregistered | A previously-registered item has been removed from the registry. |
| Register error | An error has occurred while the item was being registered either with the data pool or with the Global Registry. |

| Status | Meaning |
| --- | --- |
| Modify error | An error occurred while a message was being sent to the data pool to update information about a registered item. |

The search mechanism implemented within the control module enables users to search for trade items by keyword or by using advanced parameters such as status, brand or product category. Once the user has located a specific trade item or displayed the appropriate list, the user can then view comprehensive trade item information for the item, edit the trade item and store the updated data in the system. For instance users can search by item name, status, target market, category or brand. Upon submission of the search query a list matching the search parameter is displayed. Users can further filter or sort search results if desired and obtain further detail by selecting items returned in the search results.

Once the trade item information is complete, users can submit validate and register the trade item (see e.g., FIG. 5, steps 603-605), for subsequent publication to trade partners. This insures that only clean and validated data is propogated to the trade partners. A prerequisite of registration is that data pool used as the source data pool for synchornization needs to be defined by the user or within the data itself This configuration ensures that the software automatically enables the appropriate messaging for the specified data pool. Information about the data pool is typically provided via a data pool management interface.

To register users submit the trade item information to the control module which verifies the data conforms to system wide rules, if so the module enables the user to register the GTIN by posting the GTIN and any associated information to the data pools as defined by the user. In one or more embodiments of the invention validity checks are integrated into the data entry process in order to prevent insertion of conflicting or incorrect data. The validation procedure checks for a number of different types of data conflicts and can, for instance, ensure that information in fields indicated as mandatory is complete and has acceptable values. In instances where fields have an associated set of data dependencies, the system ensures that the value of two or more interrelated fields are completed with acceptable values. For example, the system does not allow the net weight of an item to exceed its entered gross weight. After the system checks that the item data is complete and appropriate for the selected source data pool, the appropriate message is then sent to the source data pool for each confirmed trade item. For some data pools, a separate message for item linking is also sent. Trade items that are not complete or that include errors are indicated in this screen and not sent for registration.

The purpose of the validation procedure is to guarantee that users enter valid information into all fields indicated as mandatory and may not be allowed to proceed with data entry until all mandatory information has been correctly entered. For instance, in one embodiment of the invention the control module ensures entry of parameters as required by the Global Registry. These parameters comprise a limited data set certified to be EAN.UCC compliant and serve as a pointer to source data pools where master data resides.

Owning Organization: Name of the company that owns the trade item.

Product form: The physical shape or form of the product, distinct from the product packaging. For example, in the pharmaceutical industry, a product may come in the form of a pill or a liquid.

Own Label/private Label: Indicates that the master data for the trade item is restricted to a specific user. This is in contrast to "public" data, which is available to anyone requesting information about the trade item.

Parameters describing the product and its packaging.

Sub Brand: A second, optional, level of brand name.

Variant: Free text providing distinguishing characteristics that differentiate the product from others with the same brand and size; such as flavor, fragrance or taste.

Alternate Item Classification Scheme: Used when an alternate classification schema has been used, in addition to the EAN.UCC classification scheme.

Measurement: measurement details of the product and its packaging.

Product is Base or Concentrate: Indicates if the item is at the base level of the product hierarchy or is at another level.

Logistics: Product handling and packing parameters.

Links: For a complex trade item, the number and description of next lower-level trade items contained in it. A complex trade item can contain at least two different GTINs.

Add. Descr.: Free-text additional product description. For instance, Trade Item Group: a general description of the logical group to which the trade item belongs, independent of the Global trade item classification. Coupon Family Code: Code assigned to families of consumer trade items for use in store scanners, in conjunction with UPC coupon value codes. Product PLU Description: Text explaining the four- or five-digit Price Look Up number.

TM Specific: Product marking and packaging information.

Haz. Mat.: Hazardous material information. For instance, Hazmat Class Code:

Dangerous goods classification of the trade item. There are nine danger "classes," some of which are further subdivided into subclasses. Each class number generally indicates the nature and properties of the goods and serves to classify them together in terms of their most significant risk. Hazard Code: Dangerous goods hazard ID number, which must be applied to the vehicle when transporting this trade item (dangerous good) by road or rail. The police, fire brigade and others use this code in case of an accident to indicate the kind of danger potentially caused by the cargo. Hazmat Number: Indicates if a dangerous goods a-margin number exists for this item in the European dangerous goods agreements. Used to facilitate transport of the item in a defined limited quantity.

Nutrition (Foods only): Nutritional content and labeling information

Average Usages Per Trade Item: Average number of usages that can be expected from a trade item before it becomes unusable.

In order to distribute trade item data to trade partners and other required data recipients, the content owner publishes the data through the source data pool (see e.g., FIG. 5, step 606). Information about "public" items is available through the source data pool to anyone requesting the information. The source data pool sends a message to those trade partners specified by the content owner to notify them that a new trade item is available or that a previously published item has been updated. Users can publish the trade item(s) through the control module in one of two ways: 1) using a Publication By GTIN function, in which users search for and display the trade item to publish, and then select the trade partners to which it is published and 2) using the Publication By Partner function, in which users select a trade partner to whom the user can publish multiple trade items.

The procedure for publishing a GTIN to trade partners comprises adding the selected trade partners to a list of partners to which the item has been published. The system sends a message to the source data pool with the item and the selected GLNs so that the information is distributed to the relevant partners. A message is sent back or retrieved from the data pool with authorization of the operation, or an appropriate error message, which is displayed as a publication status for the item (see e.g., FIG. 5, steps 607 and 608).

It is also feasible to remove selected trade partners from the list of partners to which the item was published. To do so the system sends a message to the source data pool with the item and the selected GLNs so that the relevant partners can be removed from the publication-list. A message is sent back or retrieved from the data pool with authorization of the operation.

The procedure for publishing multiple trade items to a trade partner comprises sending, upon confirmation of publication, a message with all relevant information to the selected source data pool for distribution to the trade partner. If for some reason the trade partner rejects the publication, the system will alter the status of the trade item to rejected and will display the reason for rejection. Hence users can monitor the status of publication with respect to each trade partner.

The control module also contains mechanisms for managing trade partners. For instance, users can edit the details of a trade partner in the list, add a new top-level trade partner, add a new child trade partner, and/or remove a trade partner from the list.

The control module also contains mechanisms for managing the data pools. For instance, in order to register items to a data pool and publish items to trade partners, users must typically first define the data pool information (unless the data pool definition is obtained elsewhere). Using a data pool management function, users can edit details about a data pool, add a new data pool, and/or delete a data pool from the system.

Control module 200 also contains mechanisms for user administration. For instance, users with authorized access can create new system users, assign them a user name and a role. The administrator can also edit user information and remove users from the system, hi most cases users with one or more of the following roles are used: 1) editor which can add and modify data about the trade items stored in the system, 2) user which has editing privileges (like Editor) and can also register and publish trade items, and 3) admin which has all the privileges of the user but also has access to the metadata tables used to provide lists of valid values for fields managed by the data manager. One of ordinary skill in the art will of course recognize that it is possible to implement the system to use varying levels of user access.

Control module 200 may also contain a metadata management function that enables authorized users (who have been assigned the Admin role) to edit the information in the tables of data displayed on the screens of the control module. Using the metadata management function users can add data to the tables, delete data from tables and modify data in the tables.

Control module 200 may also provide mechanisms for presenting interface components that utilize multi-valued attributes stored in the database schema utilized by the acceleration engine 222. For instance, a single product can be given multiple values that define different characteristics of the product. A product that is packaged in a cardboard container and wrapped in plastic can be associated with both values rather than with a single value. In addition, the use of multi-valued attributes allows for validation of the information at entry time in the user interface by presenting the user with a pull down list for example that only allows for these two values to be specified as opposed to a text field entry that allows for text based input that must be validated later.

In one embodiment of the invention control module 200 interfaces with publication engine 225 which provides functions for managing the publication of documents 250 (e.g., product catalogs, etc. . . . ) that utilize business information contained in DBMS 223 or back-end system 230. Further detail about publication engine 225 is provided below.

Control module 200 is designed to utilize whatever protocol is agreed upon between the entities utilizing the system and can, for example support standards defined by whatever data pool 204 control module 200 interfaces with. In one embodiment of the invention data pools such as UUCnet and Transora, for instance, are coupled with control module 200 through a universal adapter framework 212 and message queuing service 210 that prepares and passes message data between data pool 204 and control module 200. Although it is feasible and considered within the scope and spirit of the invention to bypass universal adapter framework 212 and message queuing service 210 by incorporating such functionality into control module 200 and/or implementing the system in a way that does not require such functionality, it is beneficial in some cases to utilize universal adapter framework 212 and message queuing service 210.

Use of universal adapter framework 212, for instance, provides entities with a mechanism to redirect skilled labor resources by performing routine tasks relating to connectivity and access routines. Another benefit of using universal adapter framework 212 is that it makes the overall system significantly more flexible by providing multiple entry points and inbound/outbound access to a wide variety of information assets.

Figure 3:
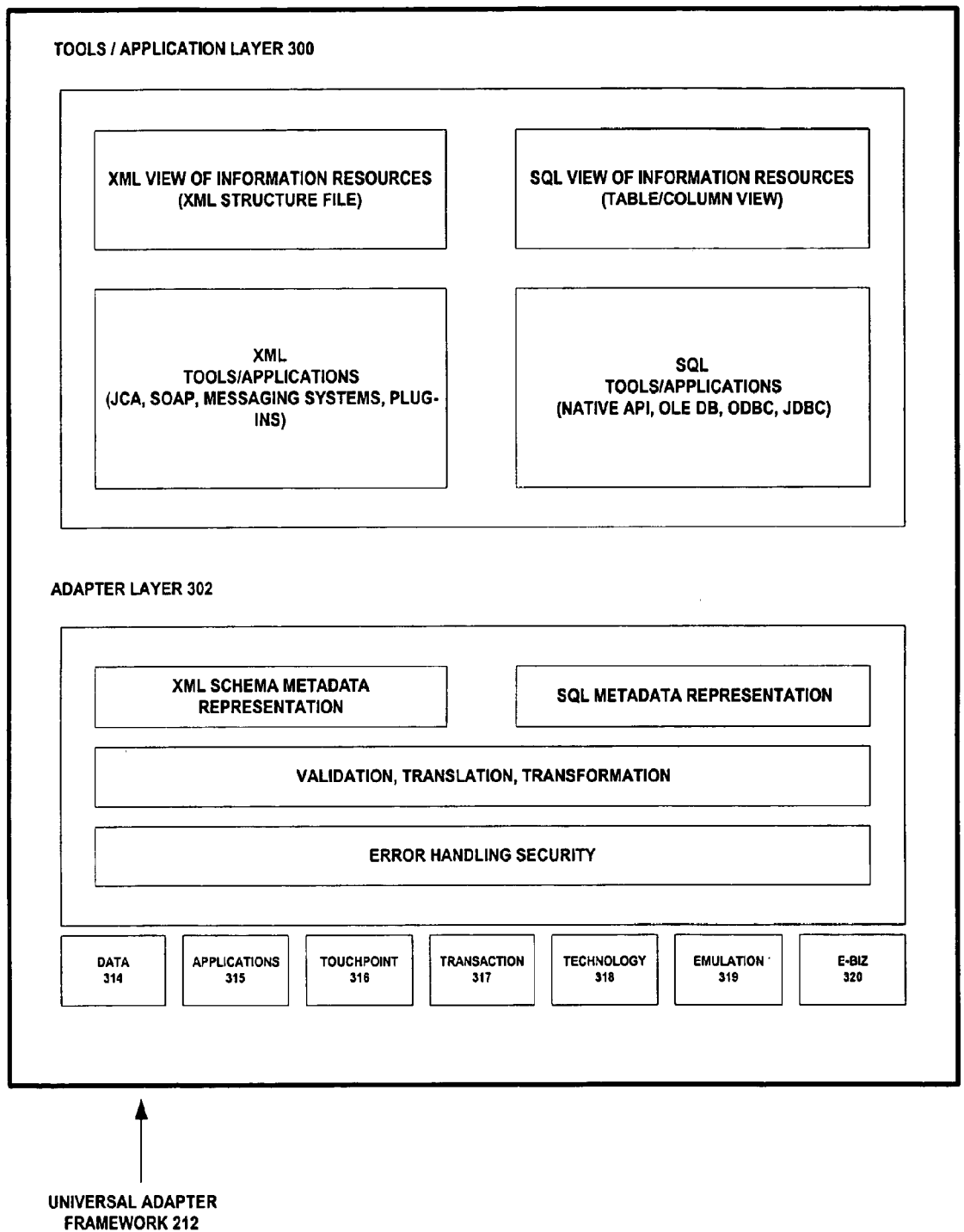
FIG. 3 illustrates the components of a universal adapter framework configured to interface with a control module configured in accordance with an embodiment of the invention.

An example of the various components present in universal adapter framework 212 is illustrated in FIG. 3. Universal adapter framework 112 may, for instance, comprise a tools/application layer 300 and an adapter layer 302 where each layer is configured to provide users with maximum flexibility during system implementation. In one embodiment of the invention tools/application layer 300 comprises XML and SQL oriented tools for interacting with various XML and SQL resources. Tools/application layer 300 contains components for obtaining an XML view of information resources and/or a SQL view of information resources. Hence it is feasible to view XML Structure files and/or table/column views of the underlying data. Some examples of the types of XML tools/applications the system can handle include, but are not limited to, JCA, Messaging Systems, SOAP, and Broker Plug-ins.

On the SQL side the system can handle Native API calls, OLE DB, ODBC, JDBC, and whatever other SQL based tools/applications are applicable to a given implementation of the invention.

FIG. 3 illustrates the components of a universal adapter framework configured to interface with a control module configured in accordance with an embodiment of the invention. Adapter classes 314, for instance are configured to provide numerous points of interface. Data adapters 314, support specific proprietary databases and file systems. Application systems adapters 315 provide object-level support for packaged application systems (e.g., Enterprise Resource Planning and Supply Chain Management systems). Touchpoint adapters 316 abstract integration issues between typical business processes, such as Work Order, Purchase Order, and Sales Order, and common packaged applications like for example Enterprise Resource Planning and Supply Chain Management systems. Transaction systems adapters 317 support automatic transaction invocation, message transformation, and error recovery for transaction processing monitors. Technology adapters 318 support many of the technologies that exist in your environment, including application frameworks, message queues, networking protocols, and more. Emulation adapters 319 use screen scraping technology to integrate legacy applications through terminal emulation. E-Business adapters 320 facilitate the automatic transformation of legacy e-business exchange formats and dialect-specific XML documents into formats compatible with XML and non-XML-based information resources.

Message queuing service 210 in FIG. 2 provides for guaranteed delivery of enterprises messages. In one embodiment of the invention, for instance, message queuing service 210 saves messages to disk before transmission and contains mechanisms for confirming delivery of the message, If delivery fails to occur or is not properly acknowledged message queuing service retransmits the message until it receives proper acknowledgement. Because of its ability to provide fail-safe delivery, message queuing service 210 is a beneficial component to include. In cooperation with exchange interface 220 systems also have a security component configured to ensure the secure transfer and synchronization of messages between the control module and the data pools.

In some cases exchange interface 220 can provide additional features and integration with various components. Exchange interface 220 is based on an open architecture and makes use of open standards such as XML and Java environments to offer services in a complex system landscape that are essentially heterogeneous. Exchange interface 220 is typically used when there is a need to integrate different systems implemented on different platforms, but may also have other useful applications. For instance, exchange interface 220 typically acts as a runtime infrastructure for message exchange, provides configuration options for managing business processes and message flow, and options for transforming message contents between sender and receiver systems.

Acceleration engine 222 provides mechanisms for improving system performance and is integrated in one embodiment of the invention to publication engine 225. Acceleration engine 222 acts as a mechanism for managing the product and trade-items stored in the system and also includes the functionality required for backup and restore, and metadata management of data utilized by control module. Acceleration engine 222 is an integrated system for content management and publishing that uses a SQL Database Management System (DBMS) 223 that in one or more embodiments of the engine bypasses SQL for its searching, sorting, and retrieval operations. Bypassing or implementing an optimized SQL interpreter allows for increase performance since standard SQL does not support the kinds of advanced structures that allow for high performance product content management. Hence acceleration engine 222 incorporates a database schema structure that extends and optimizes upon standard SQL. Aspects of this database schema are described in further detail in U.S. patent application Ser. No. 09/577,268 to Hazi et al., entitled "Timeshared Electronic Catalog System And Method" filed May 23, 2000, U.S. Pat. No. 6,754,666 to Brookler et al., entitled "Efficient Storage And Access In A Database Management System" filed Aug. 21, 2000, U.S. patent application Ser. No. 09/643,316 to Brookler et al., entitled "Data Indexing Using Bit Vectors" filed Aug. 21, 2000, U.S. patent application Ser. No. 09/643,207 to Weinberg et al., entitled "Data Editing And Verification User Interface" filed Aug. 21, 2000, U.S. patent application Ser. No. 09/960,902 published as Publication No. 20020087510 to Weinberg et al., entitled "Method And Apparatus For Structuring, Maintaining, And Using Families Of Data" filed Sep. 20, 2001, U.S. patent application Ser. No. 10/022,056 published as Publication No. 20020194196 to Weinberg et al., entitled "Method And Apparatus For Transforming Data" filed Dec. 12, 2001, U.S. patent application Ser. No. 09/960, 541 published as Publication No. 20020116417 to Weinberg et al., entitled "Method And Apparatus For Dynamically Formatting And Displaying Tabular Data In Real Time" filed Sep. 20, 2001, U.S. patent application Ser. No. 10/172,572 published as Publication No. 20030233347 to Weinberg et al., entitled "Method And Apparatus For Generating And Utilizing Qualifiers And Qualified Taxonomy Tables" filed Jun. 13, 2002, of which all the above patent and patent application are hereby incorporated by reference. Publication No. 20060106897 to Vishnia-Shabtai et al., entitled "System And Method For Dynamically Constructing Synchronized Business Information User Interfaces" filed Nov. 15, 2004, is hereby incorporated by reference. Publication No. 20070061427 to Vishnia-Shabtai et al., entitled "System And Method For Dynamically Modifying Synchronized Business Information Server Interfaces" filed Nov. 15, 2004, is hereby incorporated by reference.

Acceleration engine is coupled with an associated publication engine 225 that in one embodiment of the invention is configured to generate multi-lingual and other documents for publication. For instance, by interfacing with DBMS 223 and if necessary obtaining data from integrated back-end systems, publication engine 225 and acceleration engine 222 have the ability to generate documents and/or user interfaces in multiple languages. Hence global organizations may utilize publication engine 225 to provide various entities throughout the supply chain with regionalized documents and/or interfaces.

The publication engine also serves as an integrated catalog management tool and administration mechanism that is coupled through to a synchronized set of supply chain data. Unlike the control module which interfaces with various data pools, publication engine uses data entered through the control module or from other—sources to provide functions for generating business documents such as catalogs, brochures, web pages, user interfaces and other such documents. Publication engine is coupled through to the DBMS and backend systems through a server component contained within acceleration engine 222. Hence publication engine has access to clean data whose input is controlled in whole or part by control module 200. As discussed above control module 200 is responsible for ensuring the valid data is input and/or output by the system. In one embodiment of the invention publication engine includes functionality that enables users to obtain and utilize clean data to generate documents and submit the contents of the document for approval. For instance, using a publication layout interface optionally coupled to the system described herein users may identify what data elements or families of data are to be included in a draft document that is intended for publication (see e.g., FIG. 6, steps 700 and 701). Once the user identifies and selects the data of choice the user may then associate that data with a draft document and optionally layout the data elements as desired (see e.g., FIG. 6, step 702 and 703). For instance if a product catalog is being generated, the user may layout the graphic elements of the catalog and associate data related to a particular product or family of products to be offered in the catalog with the draft document.

When the draft document is in condition for approval the user may then submit the document for verification of the data and layout by the person or entity who is to approve the document, for instance the customer (see e.g., FIG. 6, step 704). This draft document acts as an electronic blue-line and provides the customer or whoever is to approve the draft document with an opportunity to verify the data and layout of the document prior to publication.

In one embodiment of the invention the draft document is accompanied with an approval mechanism (see e.g., FIG. 6, step 705). For instance, the draft document can be provided for approval in electronic form via an email or web page that contains a command button or other mechanism to obtain input from the individual or entity responsible for approval of the draft document. The approval mechanism may also contain an embedded set of modification tools. For instance, users may in some cases make comments about the draft document, the data in the draft document, or make edits to the data itself directly on the draft document. If applicable users may also request that the same document be generated in other languages.

To ensure approval is only given by authorized parties the system contains authentication mechanisms (e.g., password, smart card, biometrics, network address, etc.) that verify the user issuing the approval is properly authorized. After reviewing the draft, approval may be given by selecting or utilizing the approval mechanism (e.g., command button). Upon use of the approval mechanism a message is transmitted back to the creator of the draft document indicating the draft was approved (see e.g., FIG. 6, step 706)—The approval is then saved by the system for purposes of record keeping and/or accounting (see e.g., FIG. 6, step 707). If appropriate the system may also transmit the approval message to accounting systems to trigger the generation of invoices or payment. In instances where modification or changes were made by the approver, the document creator is notified of the changes and presented with an opportunity to correct any errors in the data that may exist. Upon receipt of the approval message the draft document is then forwarded to the printer for final publication (see e.g., FIG. 6, step 708).

Back-end system 230 retrieves information from enterprise information systems and provides a single point of access for all desired data sources of an enterprise. Information aggregated from the various data sources within an enterprise allows for simplified processing on control component 200 since the specifics of obtaining data from the various sources is abstracted out by back-end system 230. For example, back-end system 230 may create or update trade items and transfer the trade items and trade item status changes to the control component 200 through a system of messages managed by control component 200.

In addition to implementing the functionality described above exchange interface 220 is also used to transfer data between back-end system 230 and control module 200. The specific communication methodology used by exchange interface 220 between back-end system 230 and control component 200 may comprise message queuing, web service, TCPIIP or any other communications protocol capable of being used by back-end system 230 and control component 200.

Figure 4:
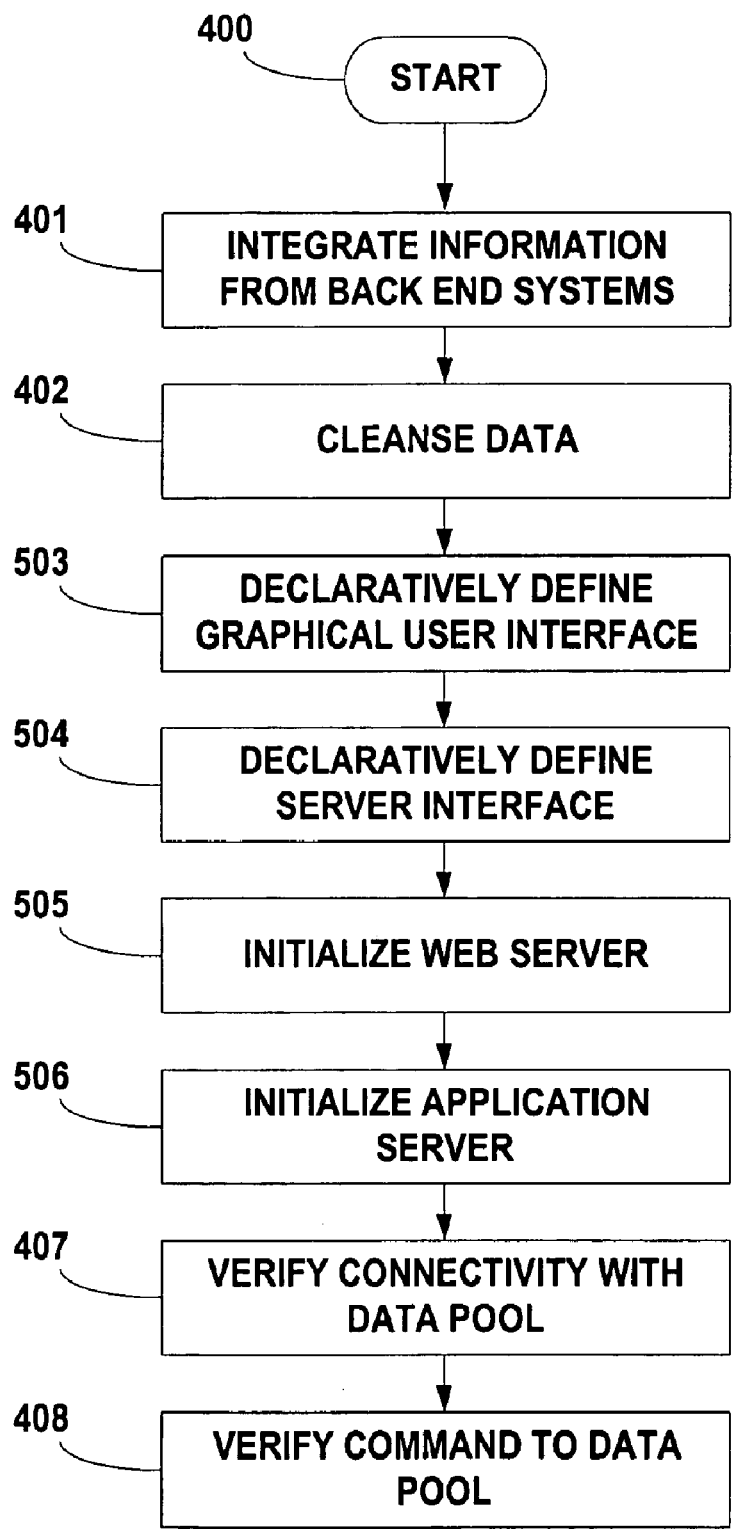
FIG. 4 illustrates the process of installing one or more embodiments of the system.

An example workflow for installing one or more embodiments of the invention is illustrated in FIG. 4 starting at 400. Information from various sources in the enterprise is integrated at 401. The integration of information may occur across diverse systems and various databases. After the data is integrated, it is cleansed in order to format the data and provide the required attributes needed for global synchronization at 402. At step 503, the graphical user interface is declaratively defined, either by using a pre-existing user interface configuration or by altering a user interface configuration. The server side of the system is declaratively defined at 504, for example by determining the particular data pool that is to be interacted and by either using an existing server interface configuration or by altering a server interface configuration to comply with the message and data attribute requirements of a chosen data pool. The various components of the system are initialized, such as the initialization of an optional web server at 505 and the initialization of an optional application server at 506. After the various system components are initialized, the connectivity to the data pool is verified at 407 by attempting to logon to the data pool. A command is sent to the data pool at 408 for example to verify trading partners or any other command in order to verify that the data pool is accepting commands from the system. The system is then considered operational.

Thus embodiments of the invention directed to an accelerated system and methods for synchronizing, managing, and publishing business information have been described to one of ordinary skill in the art. The claims, however, and the fall scope of any equivalents are what define the metes and bounds of the invention.

What is claimed is:

1. An accelerated system for synchronizing business information comprising:
   a database configured to store business information comprising trade item information;
   an acceleration engine coupled with said database, said acceleration engine configured to incorporate a database schema structure that extends and optimizes upon standard SQL, wherein said acceleration engine bypasses standard SQL to perform at least one searching, sorting, and retrieval operation;
   a control module coupled with a data pool associated with a global registry, said control module configured to manage and synchronize said trade item information with said data pool;
   a declaratively defined user interface coupled with said control module, said user interface configured to provide trade item information management functionality to a user, wherein said declaratively defined user interface is configured to be modifiable without altering source code, without recompiling and without reinstalling program components and is further configured to enforce entry of parameters required by said global registry, including product information comprising at least one of an owning organization, a product form, a privacy data label, a product packaging, a sub-brand, variant information, an alternate item classification scheme, a measurement, a product hierarchy level, a product handling parameter, a product packing parameter, a related product link, a coupon family code, a UPC, a PLU, product marking information, hazardous material information, a hazard code, a Hazmat number, or nutritional information; and
   a declaratively defined server interface coupled with said control module comprising definitions for data pool specific messages and data pool specific attributes, wherein said declaratively defined server interface is configured to be modifiable without altering source code, without recompiling and without reinstalling program components.

2. The accelerated system for synchronizing business information of claim 1, wherein said declaratively defined user interface is selected from existing user interface configurations.

3. The accelerated system for synchronizing business information of claim 1, wherein said declaratively defined user interface is generated by altering an existing user interface configuration.

4. The accelerated system for synchronizing business information of claim 1, wherein said declaratively defined server interface is selected from existing server interface configurations associated with one or more associated data pools.

5. The accelerated system for synchronizing business information of claim 1, wherein said declaratively defined server interface is generated by altering an existing server interface configuration.

6. The accelerated system for synchronizing business information of claim 1, wherein said declaratively defined user interface is further configured to allow said user to augment attributes of said trade item information required by said data pool.

7. The accelerated system for synchronizing business information of claim 1, wherein said trade item information management functionality comprises at least one of global trade item number (GTIN) management, and GTIN registration.

8. The accelerated system for synchronizing business information of claim 1, wherein said declaratively defined user interface is further configured to provide functionality comprising at least one of publication by GTIN, publication by partner, trade partner management, data pool management, user administration and metadata management.

9. The accelerated system for synchronizing business information of claim 1, further comprising an adapter framework comprising at least one adapter configured to provide an interface between said control module and an external application.

10. The accelerated system for synchronizing business information of claim 9, wherein said at least one adapter comprises at least one application systems adapter configured to provide object-level support for packaged application systems.

11. The accelerated system for synchronizing business information of claim 9, wherein said at least one adapter further comprises at least one touchpoint adapter configured to abstract integration issues between business processes and packaged applications.

12. The accelerated system for synchronizing business information of claim 11, wherein said packaged applications comprise at least one enterprise resource planning system.

13. The accelerated system for synchronizing business information of claim 11, wherein said packaged applications comprise at least one supply chain management system.

14. A computer-implemented method for synchronizing business information, said computer-implemented method comprising:
  integrating trade item information on at least one back-end computer system;
  providing required attributes for global synchronization of said trade item information; cleansing said trade item information;
  declaratively defining a user interface configured to provide trade item information management functionality to a user, wherein the user interface is further configured to enforce entry of parameters required by a global registry, including product information comprising at least one of an owning organization, a product form, a privacy data label, a product packaging, a sub-brand, variant information, an alternate item classification scheme, a measurement, a product hierarchy level, a product handling parameter, a product packing parameter, a related product link, a coupon family code, a UPC, a PLU, product marking information, hazardous material information, a hazard code, a Hazmat number, or nutritional information;
  determining a data pool for communication, the data pool being associated with the global registry;
  declaratively defining a server interface comprising definitions for messages and data attributes specific to said data pool;
  verifying said data pool is accepting communication; and
  sending and receiving trade item information with said data pool;
  wherein said user interface and said server interface are configured to be modifiable without altering source code, without recompiling and without reinstalling program components.

15. An accelerated system for synchronizing business information comprising:
  a database configured to store business information comprising trade item information;
  an acceleration engine coupled with said database, said acceleration engine configured to incorporate a database schema structure that extends and optimizes upon standard SQL, wherein said acceleration engine bypasses standard SQL to perform at least one searching, sorting, and retrieval operation;
  a control module coupled with a data pool associated with a global registry, said control module configured to manage and synchronize said trade item information with said data pool;
  a declaratively defined user interface coupled with said control module, said user interface configured to provide trade item information management functionality to a user, wherein said declaratively defined user interface is configured to be modifiable without altering source code, without recompiling and without reinstalling program components;
  a declaratively defined server interface coupled with said control module comprising definitions for data pool specific messages and data pool specific attributes, wherein said declaratively defined server interface is configured to be modifiable without altering source code, without recompiling and without reinstalling program components; and
  an adapter framework comprising at least one adapter configured to provide an interface between said control module and an external application, wherein said at least one adapter includes at least one touchpoint adapter configured to abstract integration issues between business processes and packaged applications.

* * * * *